(12) United States Patent
Schleit et al.

(10) Patent No.: US 7,415,517 B1
(45) Date of Patent: Aug. 19, 2008

(54) DEVELOPING SESSION CONTEXT FROM NONLINEAR WEB SITE FLOW RECORDS

(75) Inventors: Andrew C. Schleit, Austin, TX (US); Daniel P. Karipides, Round Rock, TX (US)

(73) Assignee: Versata Development Group, Inc., Austin, TX (US)

( * ) Notice: Subject to any disclaimer, the term of this patent is extended or adjusted under 35 U.S.C. 154(b) by 803 days.

(21) Appl. No.: 10/776,382

(22) Filed: Feb. 11, 2004

(51) Int. Cl.
*G06F 15/173* (2006.01)

(52) U.S. Cl. .................................... 709/224
(58) Field of Classification Search ................. 709/223, 709/224
See application file for complete search history.

(56) References Cited

U.S. PATENT DOCUMENTS

| | | | |
|---|---|---|---|
| 5,765,143 A | 6/1998 | Sheldon et al. | 705/28 |
| 5,958,003 A * | 9/1999 | Preining et al. | 718/100 |
| 6,282,404 B1 * | 8/2001 | Linton | 434/350 |
| 6,470,324 B1 | 10/2002 | Brown et al. | 705/28 |
| 6,681,247 B1 * | 1/2004 | Payton | 709/217 |
| 6,711,550 B1 | 3/2004 | Lewis et al. | 705/10 |
| 6,714,917 B1 * | 3/2004 | Eldering et al. | 705/10 |

* cited by examiner

*Primary Examiner*—David Y Eng
(74) *Attorney, Agent, or Firm*—Hamilton & Terrile, LLP; Kent B. Chambers

(57) ABSTRACT

A nonlinear site flow system (referred to herein as an "NLSF System") includes a nonlinear site flow context development module that works in conjunction with Web session information captured by the NLSF System to develop a context of a user's session. In one embodiment, the context of a user's session refers to interpreting the context of a user's Web session history. A nonlinear site flow context development module detects nonlinear flow events and determines whether the user, by initiating a nonlinear site flow action, such as a recall operation, has created a new session state or returned to a past session state. The nonlinear site flow context development module can then correctly determine the actual user flow during a Web session and develop an accurate context of the user's session.

23 Claims, 11 Drawing Sheets

| Batch Event Id. 512 | Session Id 502 | Record Id 508 | Record Name 506 | Record Data 504 | Server/ Browser 514 | Checkpoint State 510 |
|---|---|---|---|---|---|---|
| 1. | 205 | 393874314907269 | LogVersion | 3.0 | 1/1 | {1, MakeA, ModelA, TrimA, 2004, Config/Colors;} |
|  | 205 | 393874314907270 | SessionStart | SomeServer:192.0.0.1 |  |  |
|  | 205 | 393874314907271 | UserPreference | ZipCode:00000 |  |  |
|  | 205 | 393874324907272 | UserPreference | InitialFlow:Build |  |  |
|  | 205 | 393874614907273 | ActiveConfiguration | 2004:MakeA:ModelA: TrimA |  |  |
|  | 205 | 393874864907274 | PageState/Identifier | Config/Colors; Identifier=1 |  |  |
| 2. | 205 | 394188794907348 | PartState | Exterior:Blue:0 | 2/2 | {2, MakeA, ModelA, TrimA, 2004, Exterior:Blue, 29539.0:29539.0: inclusion/exclusion, Interior:Gray Cloth:2, Interior:Tan Cloth:999873, Config/Colors;} |
|  | 205 | 394188794907349 | Notable | 29539.0:29539.0: inclusion/ exclusion |  |  |
|  | 205 | 394188794907350 | NotableDetail | Interior:Gray Cloth:2 |  |  |
|  | 205 | 394188794907351 | NotableDetail | Interior:Tan Cloth:999873 |  |  |
|  | 205 | 394188794907352 | PageState/Identifier | Config/Colors; Identifier=2 |  |  |
| 3. | 205 | 394301234907444 | NotableDecision | false | 3/3 | {3, MakeA, ModelA, TrimA, 2004, Exterior:Blue, 29539.0:29539.0: inclusion/exclusion, Interior:Gray Cloth:2, Interior:Tan Cloth:999873, Notable Decision false, Config/Colors;} |
|  | 205 | 394301414907445 | PageState/Identifier | Config/Colors; Identifier=3 |  |  |
| 4. | 205 | 394342064907466 | PartState | Exterior:Black:0 | 4/4 | {4, MakeA, ModelA, TrimA, 2004, Exterior:Black, 29539.0:29539.0: inclusion/exclusion, Interior:Gray Cloth:2, Interior:Tan Cloth:999873, Notable Decision false, Config/Colors;} |
|  | 205 | 394342064907467 | Notable | 29539.0:29539.0: inclusion/ exclusion |  |  |
|  | 205 | 394342064907468 | NotableDetail | Interior:Gray Cloth:3 |  |  |
|  | 205 | 394342064907469 | NotableDetail | Interior:Tan Cloth:999873 |  |  |
|  | 205 | 394342254907470 | PageState/Identifier | Config/Colors; Identifier=4 |  |  |

Figure 5A

| Batch Event Id. 512 | Session Id 502 | Record Id 508 | Record Name 506 | Record Data 504 | Server/ Browser 514 | Checkpoint State 510 |
|---|---|---|---|---|---|---|
| 5. | 205 | 3945714049075(?)9 | PartState | Interior:Gray Leather:0 | | {5, MakeA, ModelA, TrimA, 2004, Exterior:Black, 29539,0:29539,0: inclusion/exclusion, Interior:Gray Leather, Interior:Tan Cloth:999873, Notable Decision false, Config/Colors} |
| | 205 | 3945716349075.10 | PageState/Identifier | Config/Colors: Identifier=5 | 5/5 | |
| 6. | 205 | 3947548849075.64 | PageState/Identifier | Config/Drivetrain: Identifier=6 | 6/6 | {6, MakeA, ModelA, TrimA, 2004, Exterior:Black, 29539,0:29539,0: inclusion/exclusion, Interior:Gray Leather, Interior:Tan Cloth:999873, Notable Decision false, Config/Drivetrain} |
| 7. | 205 | 3949223949075.99 | PageState/Identifier | Config/Options: Identifier=7 | 7/7 | {7, MakeA, ModelA, TrimA, 2004, Exterior:Black, 29539,0:29539,0: inclusion/exclusion, Interior:Gray Leather, Interior:Tan Cloth:999873, Notable Decision false, Config/Options} |
| 8. | 205 | 3957176449078.35 | PartState | Accessories:Floor Mats:0 | | {8, MakeA, ModelA, TrimA, 2004, Exterior:Black, 29539,0:29539,0: inclusion/exclusion, Interior:Gray Leather, Interior:Tan Cloth:999873, Notable Decision false, Accessories:Floor Mats, Config/Options} |
| | 205 | 3957178349078.36 | PageState/Identifier | Config/Options: Identifier=8 | 8/8 | |
| 9. | 205 | 3957372490784.0 | MismatchIdentifier | SeqIDMismatch:8 | 9/8 | |
| | 205 | 3957347949078.41 | PartState | Accessories:Floor Mats:0 | | |
| | 205 | 3957350249078.42 | PageState/Identifier | Config/Options: Identifier=9 | | |

Figure 5B

| Batch Event Id. 512 | Session Id 502 | Record Id 508 | Record Name 506 | Record Data 504 | Server/ Browser 514 | Checkpoint State 510 |
|---|---|---|---|---|---|---|
| 10. | 205 | 3959661249077889 | PageState/Identifier | ConfigVehicleSummary: Identifier=10 | 10/10 | {10, MakeA, ModelA, TrimA, 2004, Exterior:Black, 29539, 0.29539.0: inclusion/exclusion, Interior:Gray Leather, Interior:Tan Cloth:999873, Notable Decision false, Accessories:Floor Mats, ConfigVehicleSummary} |
| 11. | 205 | 3960833849079006 | PageState/Identifier | ChooseDealerBuild: Identifier=11 | 11/11 | {11, MakeA, ModelA, TrimA, 2004, Exterior:Black, 29539, 0.29539.0: inclusion/exclusion, Interior:Gray Leather, Interior:Tan Cloth:999873, Notable Decision false, Accessories:Floor Mats, ChooseDealerBuild} |
| 12. | 205 | 3961541949079017 | Dealer | Dealer A:4.5 | | |
| | 205 | 3961542049079018 | LocateSummary | 3:3:0:0.470703125:0.376 3020833333333 | | |
| | 205 | 3961542049079019 | PageState/Identifier | MatchingVehiclesBuild: Identifier=12 | 12/12 | {12, MakeA, ModelA, TrimA, 2004, Exterior:Black, 29539, 0.29539.0: inclusion/exclusion, Interior:Gray Leather, Interior:Tan Cloth:999873, Notable Decision false, Accessories:Floor Mats, Dealer A:4.5, LocateSummary 3.3:0:0.470703125:0.37630208333333, MatchingVehiclesBuild} |

| Batch Event Id. 512 | Session Id 502 | Record Id 508 | Record Name 506 | Record Data 504 | Server/ Browser 514 | Checkpoint State 510 |
|---|---|---|---|---|---|---|
| 13. | 205 | 3965223364908058 | LocateDetail | 1:SomeVINHere: 0.306640625 | 13/13 | {13, MakeA, ModelA, TrimA, 2004, Exterior:Black, 29539, 0:29539,0: inclusion/exclusion, Interior:Gray Leather, Interior:Tan Cloth:999873, Notable Decision false, Accessories:Floor Mats, Dealer A:4.5, LocateSummary 3,3:0:0.470703125:0.3763020833333 333, LocateDetail 1:SomeVINHere:0.306640625, VehicleDetailsBuild} |
|  | 205 | 3965223364908059 | PageState/Identifier | VehicleDetailsBuild: Identifier=13 |  |  |
| 14. | 205 | 3968009249082268 | *MismatchIdentifier* | *SeqIDMismatch:12* | 14/12 | {12, MakeA, ModelA, TrimA, 2004, Exterior:Black, 29539, 0:29539,0: inclusion/exclusion, Interior:Gray Leather, Interior:Tan Cloth:999873, Notable Decision false, Accessories:Floor Mats, Dealer B:4.5, LocateSummary 3,3:0:0.470703125:0.3763020833333 333, MatchingVehiclesBuild} |
|  | 205 | 3968018449082269 | Dealer | Dealer B:4.5 |  |  |
|  | 205 | 3968018549082700 | LocateSummary | 3,3:0:0.470703125:0.376 3020833333333 |  |  |
|  | 205 | 3968018549082701 | PageState/Identifier | MatchingVehiclesBuild: Identifier=14 |  |  |
| 15. | 205 | 4035798949909938 | *MismatchIdentifier* | *SeqIDMismatch:5* | 15/5 |  |
|  | 205 | 4035809349909939 | PartState | Interior:Gray Leather:0 |  |  |
|  | 205 | 4035811649909940 | PageState/Identifier | Config/Options: Identifier=15 |  |  |

Figure 5D

| Batch Event Id. 512 | Session Id 502 | Record Id 508 | Record Name 506 | Record Data 504 | Server/ Browser 514 | Checkpoint State 510 |
|---|---|---|---|---|---|---|
| 16. | 205 | 4036859649099954 | PageState/Identifier | ConfigVehicleSummary: Identifier=16 | 16/16 | {16, MakeA, ModelA, TrimA, 2004, Exterior:Black, 29539, 0.29539, 0: inclusion/exclusion, Interior:Gray Leather, Interior:Tan Cloth:999873, Notable Decision false, Accessories:Floor Mats, Dealer B:4.5, LocateSummary 3:3:0:0.47070:3125:0.37630208333333 333, LocateDetail 1:SomeVINHere:0.3066640625, ConfigVehicleSummary} |
| 17. | 205 | 4037397649099963 | PageState/Identifier | ChooseDealerBuild: Identifier=17 | 17/17 | {17, MakeA, ModelA, TrimA, 2004, Exterior:Black, 29539, 0.29539, 0: inclusion/exclusion, Interior:Gray Leather, Interior:Tan Cloth:999873, Notable Decision false, Accessories:Floor Mats, Dealer B:4.5, LocateSummary 3:3:0:0.47070:3125:0.37630208333333 333, LocateDetail 1:SomeVINHere:0.3066640625, ChooseDealerBuild} |

| Batch Event Id. 512 | Session Id 502 | Record Id 508 | Record Name 506 | Record Data 504 | Server/ Browser 514 | Checkpoint State 510 |
|---|---|---|---|---|---|---|
| 18. | 205 | 4037946749099972 | Dealer | Dealer:F11,0 | 18/18 | {18, MakeA, ModelA, TrimA, 2004, Exterior:Black, 29539, 0:29539,0: inclusion/exclusion, Interior:Gray Leather, Interior:Tan Cloth:999873, Notable Decision:false, Accessories:Floor Mats, Dealer F:11,0, LocateSummary 5:5:0:0.58398.4375:0.5050781.25, LocateDetail 1:SomeVINHere:0.306640625, MatchingVehiclesBuild} |
|  | 205 | 4037946949099973 | LocateSummary | 5:5:0:0.58398.4375:0.505 078125 |  |  |
|  | 205 | 4037946949099974 | PageState/Identifier | MatchingVehiclesBuild: Identifier=18 |  |  |
| 19. | 205 | 4038912549910033 | LocateDetail | 1:SomeVINHere:0.58398 4375 | 19/19 | {19, MakeA, ModelA, TrimA, 2004, Exterior:Black, 29539, 0:29539,0: inclusion/exclusion, Interior:Gray Leather, Interior:Tan Cloth:999873, Notable Decision:false, Accessories:Floor Mats, Dealer F:11,0, LocateSummary 5:5:0:0.58398.4375:0.5050781.25, LocateDetail 1:SomeVINHere:0.58398.4375, VehicleDetailsBuild:Identifier} |
|  | 205 | 4038912549910034 | PageState/Identifier | VehicleDetailsBuild: Identifier=19 |  |  |
|  | 205 | 4170245849914342 | ConfigurationDetail | Model:SomeTrim:true:0 |  |  |
|  | 205 | 4170245849914343 | ConfigurationDetail | Exterior:Black:true:0 |  |  |
|  | 205 | 4170245849914345 | ConfigurationDetail | Drivetrain:2WD:true,599 873 |  |  |
|  | 205 | 4170245849914347 | ConfigurationDetail | Packages and Options:Sport Package:true:1 |  |  |
|  | 205 | 4170245849914348 | ConfigurationDetail | Interior:Gray Leather:true:0 |  |  |
|  | 205 | 4170245849914350 | SessionEnd | Timeout |  |  |

Figure 5F

DEVELOPING SESSION CONTEXT FROM NONLINEAR WEB SITE FLOW RECORDS

BACKGROUND OF THE INVENTION

1. Field of the Invention

The present invention relates in general to the field of information processing, and more specifically to developing session context from nonlinear Web site flow information.

2. Description of the Related Art

The use of networks, particularly the Internet, by users continues to rise as technology and interesting destinations increase. World wide Web ("Web") sites continue to play an increasing role in the business models of many businesses. Sophisticated Web sites, such as many configuration Web sites, present a large number of navigation path options to a user, and, thus, a large amount of information about the user's activity and information presented to the user is potentially available for collection and analysis.

Historical information surrounding a user's Web site session can be very valuable information, particularly when attempting to understand the context of a user's Web session. However, reliably capturing this knowledge, recording it in a useful and accessible format, and properly interpreting nonlinear site flow events have proven elusive for conventional technology.

U.S. patent application Ser. No. 10/324,764, filed Dec. 20, 2002, and entitled "GENERATING CONTEXTUAL USER NETWORK SESSION HISTORY IN A DYNAMIC CONTENT ENVIRONMENT", inventors Daniel P. Karipides and Susumu Harada, (herein referred to as the "Karipides I Application") describes a Web system that includes a session recording and parsing system and process ("SRP System") that can capture a wide range of a user's session related information. In one embodiment, the SRP System includes two main components, data recording hooks and a parser. The SRP System includes a data recording hooks library that provides the ability to implement a dynamic, Web-based application and gather a wide-range of information about user's session activity. The SRP System parser analyzes the gathered and logged information from the data recording hooks and re-creates a session history, with a desired level of contextual detail, of every individual user's session. In one embodiment, the SRP System embodies a flexible design system that allows a designer to customize the type of information recorded so as to re-create the desired granularity of history. The Karipides I Application is incorporated herein by reference in its entirety.

Many Web sites, such as automotive configuration Web sites, include complex applications that require most pages to be dynamically generated. To support dynamic page generation, these Web sites usually store session state data for every session. The state will change as the user navigates through the site. Knowing the actual progression of state changes is important in recreating the true context of a user's session. For example, the true context of a user's session can be important in identifying quality user sessions as described, for example, in U.S. patent application Ser. No. 10/699,148, filed Oct. 31, 2003, and entitled "IDENTIFYING QUALITY USER SESSIONS AND DETERMINING PRODUCT DEMAND WITH HIGH RESOLUTION CAPABILITIES", inventor Daniel P. Karipides, (herein referred to as the "Karipides II Application") which is incorporated herein by reference in its entirety. It is also often useful to analyze as many user sessions as possible. Discarding ambiguous data from nonlinear site flow records can eliminate a significant amount of valuable data.

Most conventional Web browsers support "back", "forward", "refresh", new Web session initiating operations, and other recall operations that permit the user to arbitrarily return to previously-viewed pages. Correctly supporting recall operations can be problematic for Web sites as the Web site's current state is not necessarily the same as the state for the page to which the user is returning. To develop an accurate context of a user's session history, the Web site needs some way of recalling or reconstructing the user's state at any arbitrary page. Since this is a difficult problem to solve, most Web sites impose a linear site flow—even if the user tries to return to a page via a recall operation. Thus, an inaccurate or, at the very least, an ambiguous user history presents itself to a system attempting to develop user context from user session history.

FIG. 1 depicts a linear site flow 104 of a Web site 100. Initially, a Web server 102 displays Page 1 to a user as a result of a page request submitted via user's browser or other mechanism to Web server 102. The Web server 102 provides new Page 2 to the user's browser in response to a user New Page Request 1 action, such as selecting an embedded link in the currently displayed page. In response to New Page Request 2, the Web server provides a New Page 3 to the user's browser. The user next selects a back button of the browser. The Web server 102 considers the recalled page as a new Page 4 although New Page 4 is actually Page 2 again. The user next submits New Page Request 3, and the Web server 102 provides New Page 5 to the user, which is actually the fourth new page provided to the user's browser.

FIG. 2 depicts a nonlinear site flow 200 represented by a tree structure. Websites that do properly support reconstructing the user's state permit the user to have a nonlinear site flow like the tree structure depicted in FIG. 2. As in FIG. 1, the user begins with Page 1, submits New Page Request 1, and Web server 202 provides new Page 2 to the user's browser. After submitting New Page Request 2 and receiving new Page 3, the user selects the browser's back button, and Web server 202 provides previously viewed page 2 to the user. Thus, the Web server is aware that current state is actually the same as the former state when Page 2 was previously provided. From Page 2, the user requests new Page 4. However, many Web sites do not support recognition of nonlinear site flow. Furthermore, conventional technology does not support developing a contextual session record that accounts for nonlinear site flow.

SUMMARY OF THE INVENTION

In one embodiment of the present invention a method of developing user context from user Web session data that includes nonlinear site flow events includes detecting a nonlinear site flow event in the user session data, determining which, if any, information associated with the nonlinear site flow event should be included in the user context, and developing the user context in accordance with the determination of which, if any, information associated with the nonlinear site flow event should be included in the user context.

In another embodiment of the present invention a method for detecting nonlinear site flow and developing an accurate user session context includes receiving Web page requests initiated by a user, wherein the requests each include a respective request identifier that identifies a next page expected to be provided to the user by a Web server application and recording each batch of events associated with each Web page request. The method further includes tracking a server-side identifier for each batch of events associated with each Web page request and recording a nonlinear site flow event for a batch of events when the request identifier in the Web page request does not correspond to the server-side identifier. The method also includes determining which, if any, information associated with the nonlinear site flow event should be included in the user context and developing the user context in accordance with the determination of which, if any, information associated with the nonlinear site flow event should be included in the user context.

In a further embodiment of the present invention a system for developing user session context from user session records that include nonlinear site flow events includes a processor and a memory coupled to the processor and having instructions stored therein and executable by the processor to (a) detect a nonlinear site flow event in the user session data, (b) determine which, if any, information associated with the nonlinear site flow event should be included in the user context, and (c) develop the user context in accordance with the determination in (b).

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5A-5F depict an example log file containing a set of user session records and checkpoint state information used by the process of FIG. 4.

DETAILED DESCRIPTION

Developing a contextual session record of a user's session flow that accounts for nonlinear site flow poses a difficult problem. As described above, users can generally navigate through a Web site by taking actions that create a nonlinear site flow. Such actions include recalling a previously viewed page(s) and creating a new site flow path from the recalled page(s). A nonlinear site flow system (referred to herein as an "NLSF System") described herein includes a nonlinear site flow context development module that works in conjunction with Web session information captured by the NLSF System to develop a context of a user's session. In one embodiment, the context of a user's session refers to interpreting the context of a user's session history. User session history refers to recorded actions taken and information exchanged between a user and a Web site. In one embodiment, the NLSF System only uses selected actions and information to develop the user's context. The particular selection is a matter of design choices and depends upon the intended uses of user session history and context data.

In one embodiment, the NLSF System collects user session activity information related to the user and Web site actions and information exchanged during a Web session. A nonlinear site flow context development module detects nonlinear flow events and determines whether the user, by initiating a nonlinear site flow action, such as a recall operation, has created a new session state or returned to a past session state. The nonlinear site flow context development module can then correctly determine the actual user flow during a Web session and develop an accurate context of the user's session. By knowing the actual site flow and by reconstructing state session information, the NLSF system can properly construct the context of the user's Web session from the collected user session information. The ability to, thus, accurately develop context from user session history that includes nonlinear site flow activity provides validity to analytical processes operating on the user session data, such as the processes described in the Karipides II Application.

Figure 1:
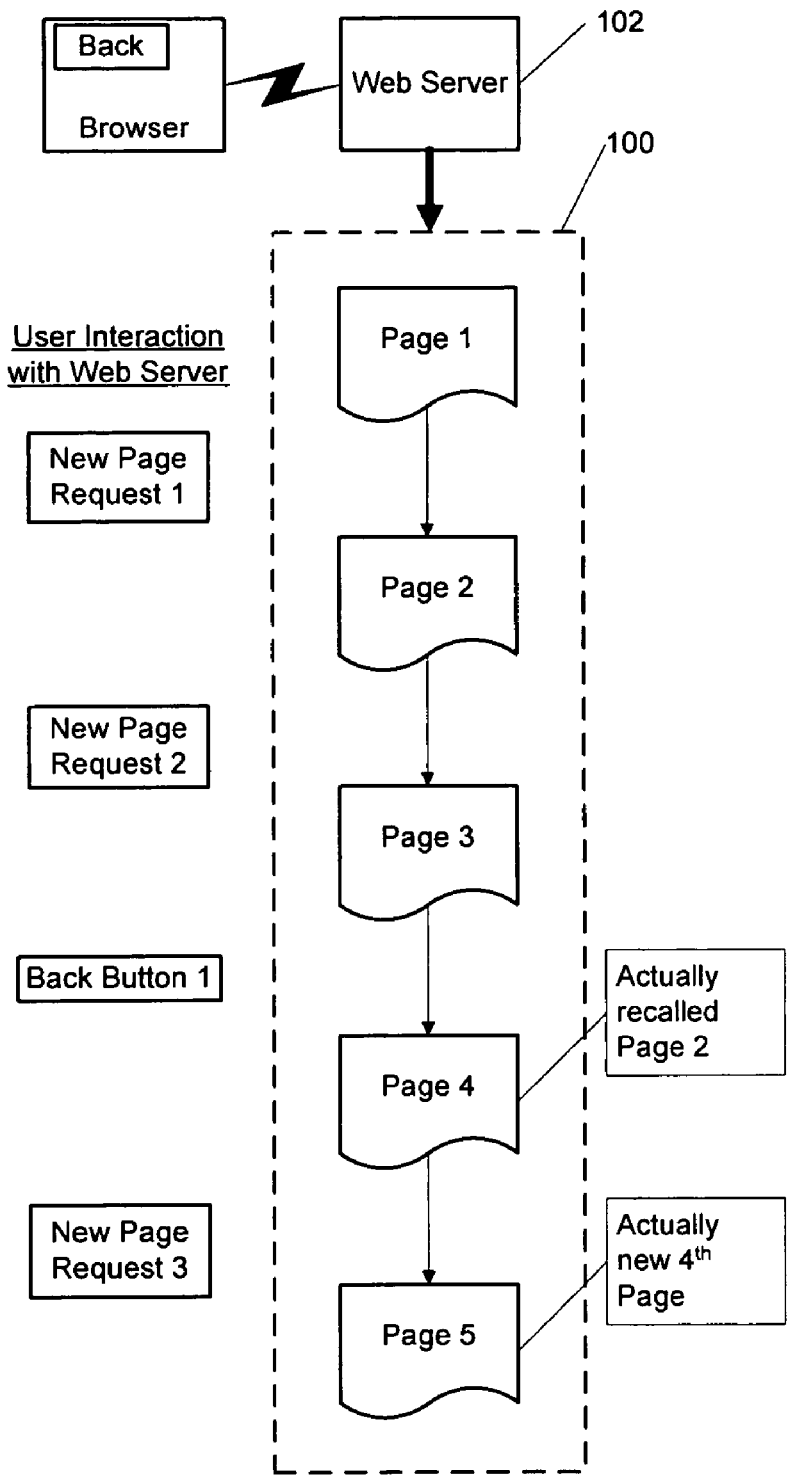
FIG. 1 (prior art) depicts a Web site with linear site flow support.
Figure 2:
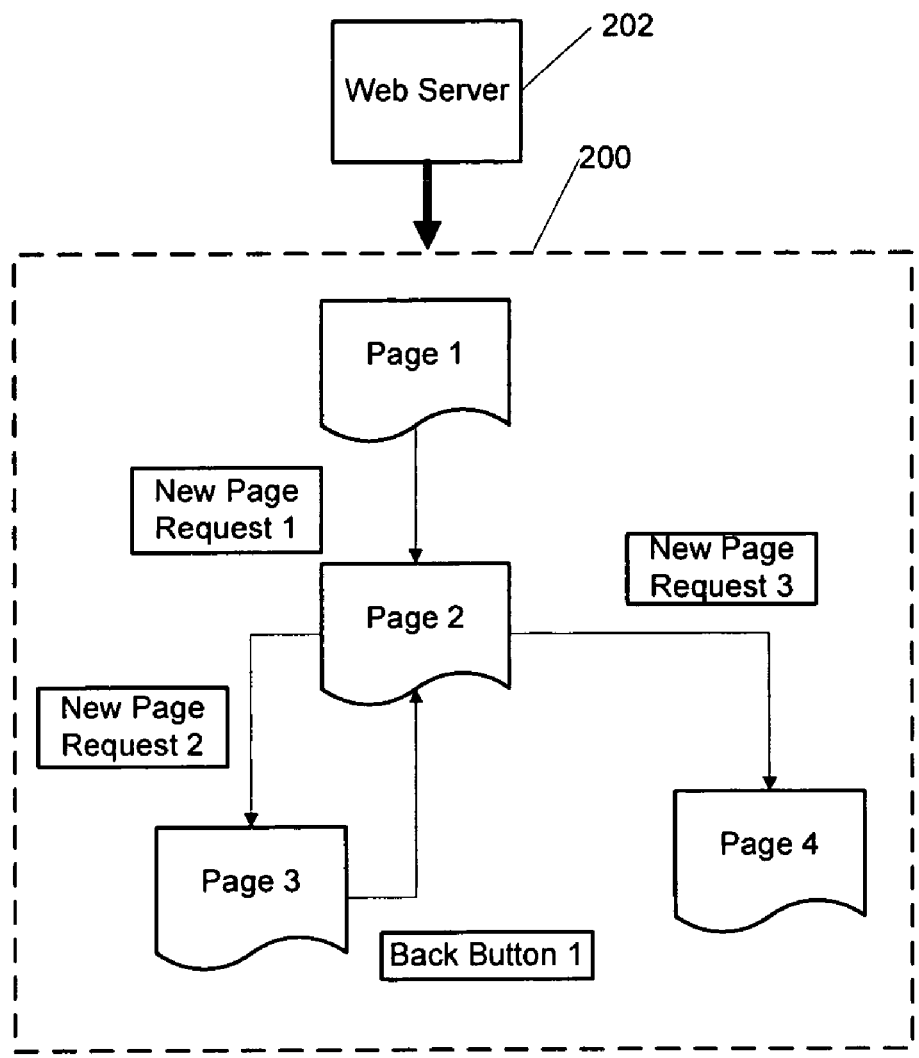
FIG. 2 (prior art) depicts a Web site with nonlinear site flow support.
Figure 3:
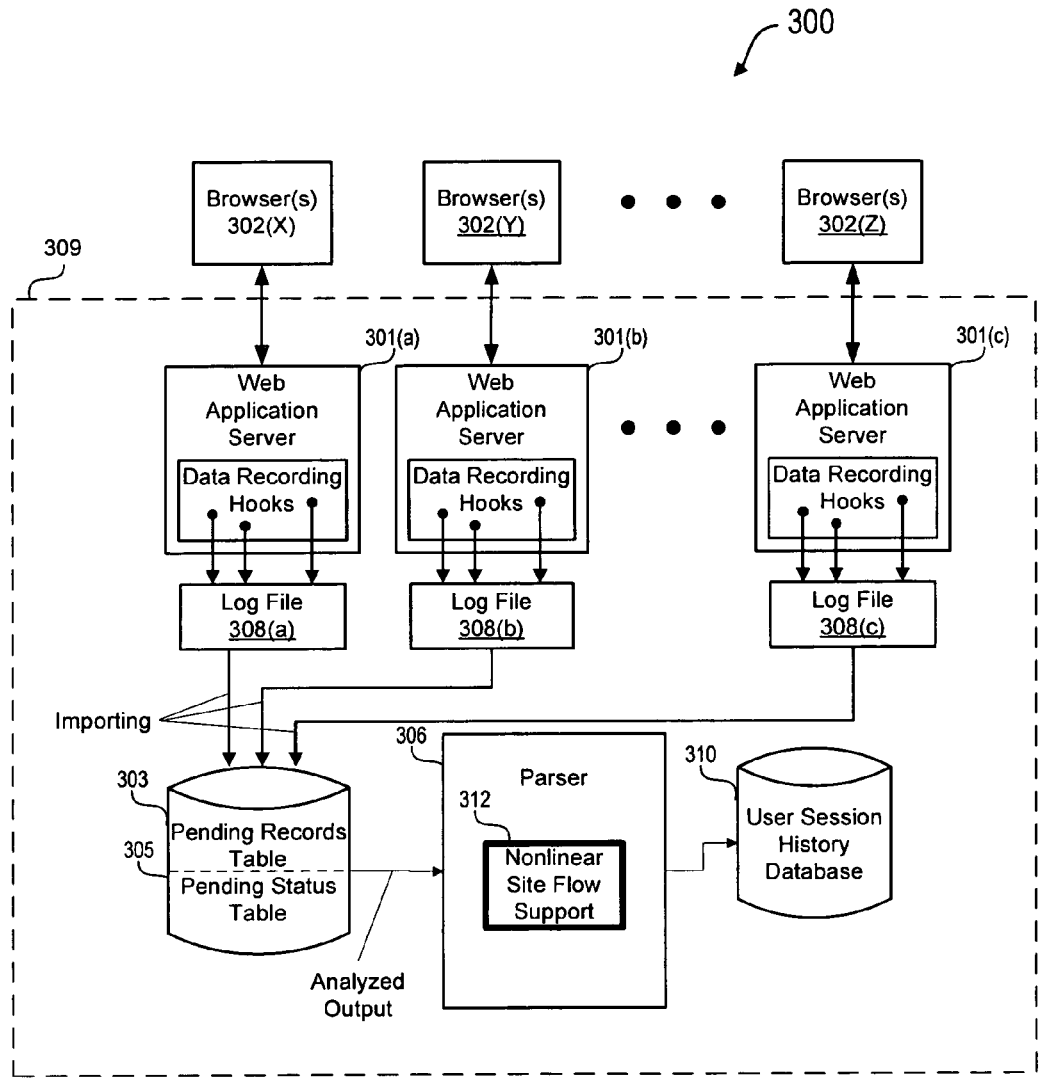
FIG. 3 depicts a session context development Web system for developing session context from nonlinear site flow information.

FIG. 3 depicts an NLSF System 300 that includes a session recording, parsing, and nonlinear site flow context development system 309 (referred to herein as "SRPN System 309") Web site. In one embodiment, SRPN System 309 is identical to the session recording and parsing system described in the Karipides II Application, particularly the session recording and parsing system 602 of the Karipides II Application, with the exception that SRPN System 309 includes a nonlinear site flow context development module 312 that allows parser 306 to develop user session context. SRPN System 309 includes any number of Web application servers 301, with each specific Web application server being denoted by a parenthetical letter. Web application servers 301 exchange requests and responses with browsers 302(a)-302(c). Each Web application server 301 can include a web server program and other application programs such as a configurator application. Browsers 302(a)-302(c) may contain data recording hooks to record and provide information as described in more detail in the Karipides II application.

Capturing user session information and logging the information in records is one part of the process of assembling a useful user session history. Another part is parsing the records. Support for non-linear site flow is difficult in a conventional parser. To overcome such difficulty, the parser 306 stores a copy of volatile user session state data (also referred to herein as "Checkpoint States") as parser 306 processes each collection of related events generated by the SRPN System 309 using the nonlinear site flow context development module 312. An event represents data recorded in association with user and/or Web application server activity. SRPN System 309 creates a Checkpoint State each time the SRPN System 309 captures a new, related collection of user session information except in certain nonlinear flow situations. The nonlinear site flow context development module 312 also allows the parser 306 to support arbitrarily recalling previous state at any point in time. In at least one embodiment of NLSF System 300, SRPN System 309 and data recording hooks perform certain tasks so that parser 306 can correctly detect and parse session records that include one or more nonlinear site flow events. Each user request generally prompts batches of events to be generated. All of the events recorded into log file 308 in response to a single request are one example of a collection of related events and are referred to herein as "Batch Events." Log files 308(a)-308(c) store the recorded Batch Events of respective Web application servers 301(a)-301(c). The number of Batch Events stored per user session depends upon the amount and type of session data captured by SRPN System 309.

In one embodiment of SRPN System 309, the NLSF System 300 includes the Characteristics set forth in Table 1 to allow the parser 306 and nonlinear site flow context development module 312 to properly develop user session context from a nonlinear site flow:

TABLE 1

NLSF System 300 Characteristics

1. The SRPN System 301 is able to properly recall or reconstruct the user's session state when the user initiates a page recall operation.
2. The SRPN System 301 maintains an incrementing counter of request identifiers for every Web page request of a user session. Thus, each request is associated with a unique identifier.
3. Data recording hooks log the incrementing request identifier maintained by SRPN System 301 after every request from a user.
4. A query string in each page request from a user submitted to a Web application server of SRPN System 301 contains in the query string the expected value of the request identifier of the next page request from the user. For example, on a Web page with request identifier 1, here is some HTML for a link that embeds the next expected request identifier, 2, in the query string:
   <a href="http://www.trilogy.com/nextpage.html?nextidentifier=2">
   Click here to view the next page</a>
5. The data recording hooks log the expected value of the request identifier from the query string when the expected request identifier submitted by the user is not equal to the actual request identifier maintained by the Web application server. This event is a nonlinear site flow event and is logged as, and otherwise known as, a "Mismatch Identifier" For example, a user query string may make a request for the third page of a user session when the server expects to provide the tenth page.
6. The data recording hooks clearly demarcate batches of events so that the nonlinear site flow context development module 312 can properly segment and recall distinct and related collections of user content information. The request identifier in Characteristic number 3 can serve as an event demarcation identifier.

When a user initiates a page recall operation, the Web browser 302 may have initiated a nonlinear site flow event by either:

(1) loading a locally-cached copy of the page and submitting a new request from the cached page ("Nonlinear Site Flow Case 1"); or (2) re-submitting an original request to the Web application server 301 ("Nonlinear Site Flow Case 2").

In Nonlinear Site Flow Case 1, the Web application server 301 does not know when the user returned to a previous page. Nevertheless, the parser 306 should record events associated with the new page request of Nonlinear Site Flow Case 1, because the new page request is generating new contextual information. This new information represents a valid portion of the user's Web session context. In Nonlinear Site Flow Case 2, the resubmission of an original request does not represent new information. Therefore, when reconstructing a user's session context, the parser 306 should ignore data recorded in association with the second event because the data does not include new information. It is possible for a user in Nonlinear Site Flow Case 1 to perform a site flow (and associated set of events) which looks exactly like Nonlinear Site Flow Case 2. In this case, the user is not providing any new contextual information, so Nonlinear Site Flow Case 2 is assumed. It is not necessary to create a Checkpoint State in the case of Nonlinear Site Flow Case 2 because no new contextual information was presented.

Figure 4:
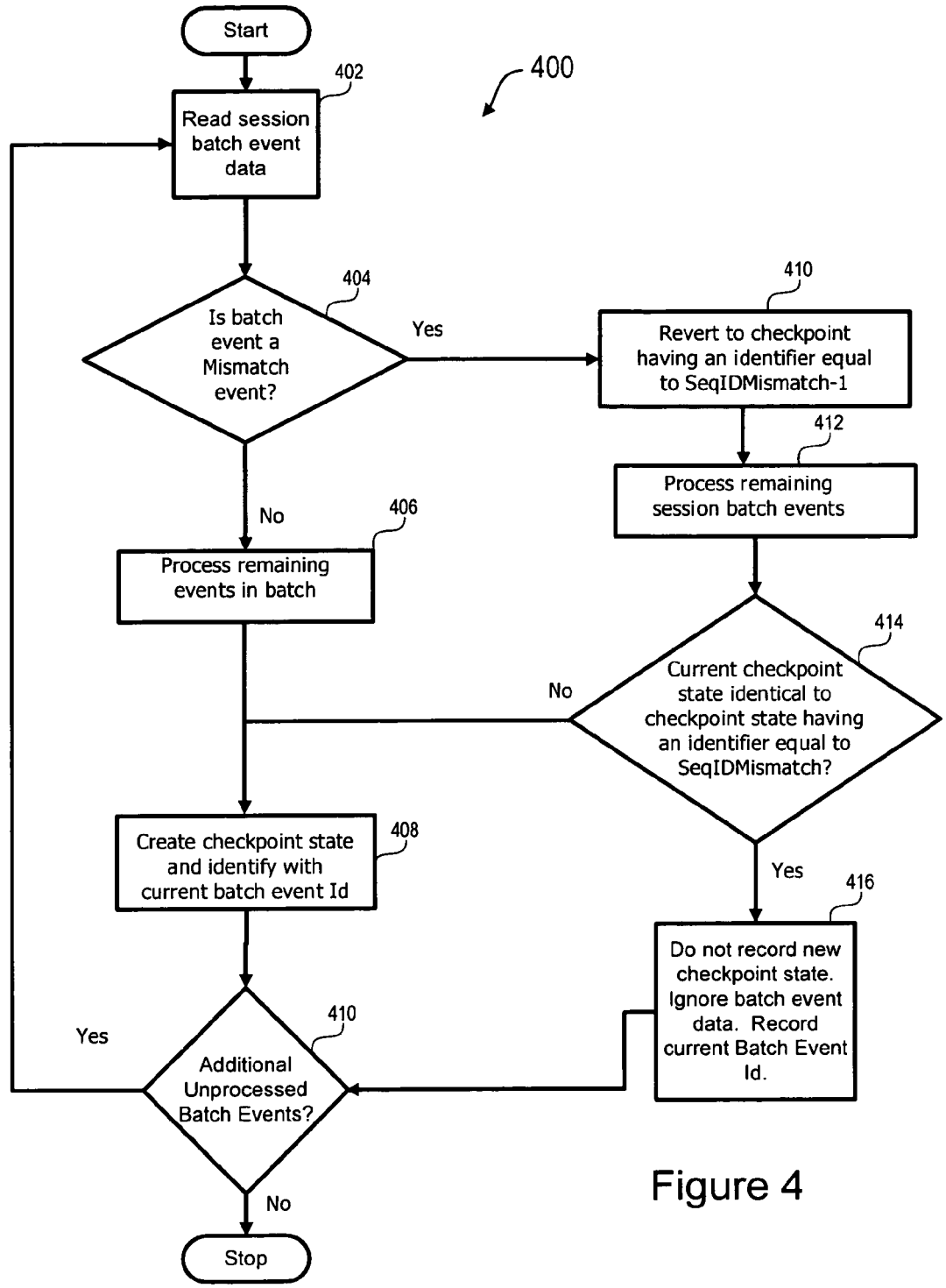
FIG. 4 depicts a process for developing session context from nonlinear site flow information.

FIG. 4 depicts an embodiment of a nonlinear site flow context development operation 400 that can implement nonlinear site flow context development module 312. The nonlinear site flow context development operation 400 will be explained in conjunction with the example log file 500 of FIGS. 5A-5F (collectively referred to as "FIG. 5"). FIG. 5 contains all 19 batch events 502 of a single user session history represented by the logged information captured by hooks of SRPN System 309. SRPN System 309 preferably uniquely identifies each user session with a Session Id 502, which is "205" for log file 500. The log file 500 stores specific Record Data 504, which is associated with a Record Name 506 and a Record Id 508. The particular logged Record Data 504 is a matter of design choice that depends upon, for example, the intended use of the Record Data 504.

In compliance with Characteristic 1 of Table 1, SRPN System 309 stores Checkpoint State 510. The parser 306 uses checkpointing to support recalling user context session state information for each page. Except in special circumstances described below, a state is checkpointed when the parser 306 detects a Batch Event demarcate identifier. When a state is checkpointed, a unique identifier is associated with the state. At any point in the future, the parser 306 can use that state identifier to set the current state equal to the state at the time it was checkpointed. Checkpointing can be implemented by copying the current user context state and placing the state copy and the identifier into a map. Any state that can change as the user progresses through the Web site should be included in the checkpoint. To conserve resources, state information can be stored outside of the user context, and the user context instead contains a reference to this state. In this case, the reference would be included in the Checkpoint State instead of a copy.

In one embodiment, Checkpoint State 510 includes a unique identifier mapped to a specific Batch Event Id 512. Log file also clearly demarcates batches of events with the demarcate identifier Record Name 506 "PageState/Identifier" in compliance with Characteristic 6 of Table 1. The Record Data 504 associated with the PageState/Identifier contains the request identifier recorded in compliance with Characteristic 3 of Table 1. In compliance with Characteristic 5 of Table 1, the Record Data "SeqIDMismatch" associated with Record Name "MismatchIdentifier" contains the actual value of the request identifier when the expected identifier submitted by a user is not equal to the actual request identifier maintained by the Web application server 301 hosting the particular user Web session.

The Server/Browser column 514 represents the server request identifier maintained by SRPN System 309 in compliance with Characteristic 3 of Table 1 and the expected value of the next page request from the user submitted in compliance with Characteristic 4 of Table 1 and logged in compliance with Characteristic 5 of Table 1. The Server/Browser column 514 is typically not actually recorded in log file 500 but is used herein to illustrate nonlinear site flow context development operation 400.

In one embodiment, the nonlinear site flow context development operation 400 sequentially processes data from each batch event of each user session to develop site flow context. Upon starting operation 400, operation 402 reads session Batch Event data beginning with Batch Event Id 1. The Record Name "PageState/Identifier" demarcates the end of each Batch Event. Operation 404 determines whether the Batch Event is a Mismatch Event. A Mismatch Event occurs when the next page request identifier submitted by the user does not match the expected request identifier maintained by the Web application server 301 hosting the particular Web session. In compliance with Characteristic 5 of Table 1, the data recording hooks log the expected value of the request identifier from the query string when the expected request identifier submitted by the browser 302 is not equal to the actual request identifier maintained by the Web application server 301. Because the Batch Event Id 1 does not contain a submitted request identifier from the browser 302, a Mismatch Event has not occurred. Server/Browser column 514 indicates that the browser 302 expected a page request identifier 1, and the server provided the requested page. Operation 406 processes the remaining events in Batch Event Id 1. In one embodiment, operation 406 extracts context information from the remaining events in Batch Event Id 1 that is useful for post-parsing operations that utilize the context information, such as the operations described in the Karipides II Application.

If a Batch Event includes a mismatch identifier, the mismatch identifier is preferably the first event logged in a batch of events so as to avoid unnecessary processing such as look ahead processing.

Operation 408 creates a Checkpoint State 510 and identifies the Checkpoint State 510 with the Batch Event Id that contains the Record Data 504 used to create the Checkpoint State 510. As described in more detail below, the Checkpoint State 510 allows the parser 306 to distinguish between new and repeating previous states and to reconstruct user session state in Nonlinear Site Flow Cases. Operation 410 determines if there are additional, unprocessed batch events to be processed. If not, nonlinear site flow context development operation 400 returns to operation 402. Nonlinear site flow context development operation 400 processes Batch Event Id's 2-8 in the same manner as Batch Event Id. 1.

Referring to Batch Event Id. 9, operation 402 reads in the first event of Batch Event No. 9. The first Record Name 506 of Batch Event No. 9 is MismatchIdentifier, and the associated Record Data 504 is SeqIDMismatch:8. The next request identifier submitted by the user was "8" as indicated by the value associated with "SeqIDMismatch." Web application server 301 logs the request identifier submitted by the user in compliance with Characteristic 5 since the Web application server 301 expected a request identifier of 9 (as indicated in Server/Browser column 514). Thus, operation 404 detects a mismatch event that indicates an occurrence of a nonlinear site flow event in the user's session history. Other than the MismatchIdentifier event and the Batch Event Id., the remaining events of Batch Event Id. 9 and Batch Event Id. 8 are the same.

Nonlinear site flow context development operation 400 proceeds to operation 410. Operation 410 determines the session state associated with the previous Batch Event, i.e. Batch Events Id. 8. Because of the numbering schema used for this embodiment of nonlinear site flow context development module 312, operation 410 subtracts "1" from SeqID-Mismatch to determine the previous Batch Event Id. Operation 410 then sets the current user session state to the checkpointed state having a checkpoint identifier associated with MismatchIdentifier-1, i.e. the Checkpoint State of Batch Event Id. 7. Operation 412 then processes the remaining session events of Batch Event Id. 9. In one embodiment, operation 406 extracts context information from the remaining events in Batch Event Id 1 that is useful for post-parsing operations that utilize the context information, such as the operations described in the Karipides II Application.

Operation 414 now determines whether the nonlinear site flow event of Batch Event Id. 9 was a Nonlinear Site Flow Case 1 or Case 2 event by comparing the current Checkpoint State set by operation 410 with the Checkpoint State equal to the value of SeqIDMismatch. In this case, the current state and the state represented by the Checkpoint Identifier * are identical. When the two Checkpoint States compared by operation 414 are identical, nonlinear site flow context development operation 400 assumes that a Nonlinear Site Flow Case 2 event occurred. Any data created by Batch Event Id. 8 is, thus, ignored as indicated in operation 416 since no new relevant contextual information has been presented. Operation 416 does record the current Batch Event Id. as being another possible Checkpoint State Identifier for the state currently identified by the value of SeqIDMismatch. In this example, future requests for checkpointed state at Checkpoint Identifiers 8 or 9 would return the state originally associated with Checkpoint Identifier 8 only.

Operation 410 next determines that additional Batch Events remain to be processed, and operation 402 reads in data from Batch Event Id. 10. The nonlinear site flow context development operation 400 continues processing through Batch Event Id. 13 in the same manner as described in conjunction with Batch Event Id. 1.

During processing of Batch Event Id. 14, operation 404 detects a Mismatch Event by identifying the MismatchIdentifier SeqIDMismatch:12. Because of the numbering schema used for this embodiment of nonlinear site flow context development module 312, operation 410 subtracts "1" from SeqID-Mismatch to determine the previous Batch Event Id. Operation 410 then sets the current user session state to the checkpointed state associated with MismatchIdentifier-1, i.e. the Checkpoint State of Batch Event Id. 11. Operation 412 then processes the remaining session events of Batch Event Id. 14 as previously described. Operation 414 compares the current state against Checkpoint State 12 (the value of SeqID-Mismatch is 12). The two compared Checkpoint States are different, so the result in operation 414 is "No." Thus, nonlinear site flow context development operation 400 determines that a Nonlinear Site Flow Case 1 occurred.

The nonlinear site flow context development operation 400 then continues as described above until completing processing of all Batch Events of Session ID 205. The events after the events of Batch Event 19 were recorded when the user's session had ended. These are not part of a Batch Event since no nonlinear site flow can occur after the session has ended. They are processed similarly to Operation 406.

Once nonlinear site flow context development operation 400 completes processing of all Batch Events associated with a particular Session Id, the parser 306 can easily construct the context of the user session by using all Checkpoint States that are not marked to be ignored pursuant to operation 416. In one embodiment, the context of the user session is represented by the non-ignored Checkpoint States and their order as recorded in log file 500. Thus, NLSF System 300 is able to develop session context from nonlinear Web site flow records.

Figure 6:
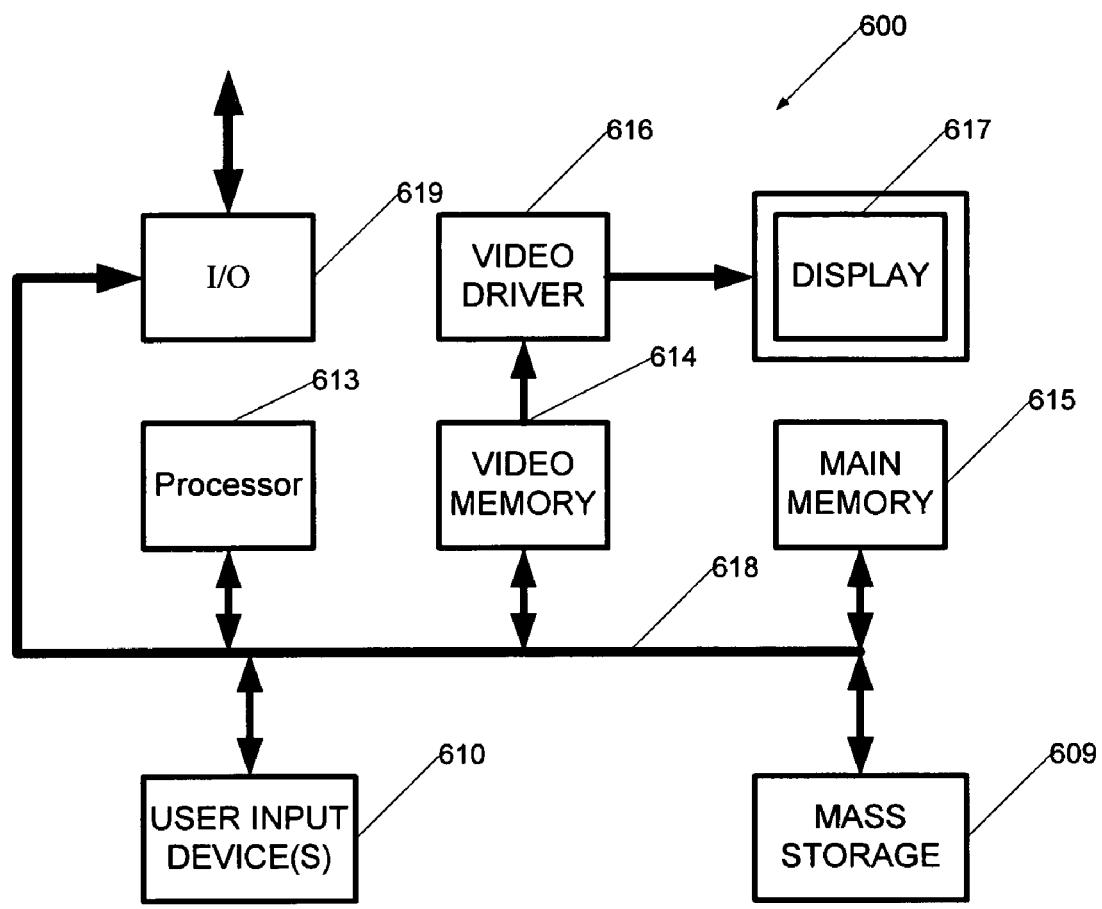
FIG. 6 depicts a computer system for implementing a process for developing session context from nonlinear site flow information.

Embodiments of Web browsers, Web application servers, parser 306, and other software modules can be implemented on a computer system such as a general-purpose computer 600 illustrated in FIG. 6. Input user device(s) 610, such as a keyboard and/or mouse, are coupled to a bi-directional system bus 618. The input user device(s) 610 are for introducing user input to the computer system and communicating that user input to processor 613. The computer system of FIG. 6 also includes a video memory 614, main memory 615 and mass storage 609, all coupled to bi-directional system bus 618 along with input user device(s) 610 and processor 613. The mass storage 609 may include both fixed and removable media, such as other available mass storage technology. Bus 618 may contain, for example, 32 address lines for addressing video memory 614 or main memory 615. The system bus 618 also includes, for example, an n-bit data bus for transferring data between and among the components, such as CPU 609, main memory 615, video memory 614 and mass storage 609, where "n" is, for example, 32 or 64. Alternatively, multiplex data/address lines may be used instead of separate data and address lines.

I/O device(s) 619 may provide connections to peripheral devices, such as a printer, and may also provide a direct connection to a remote server computer systems via a telephone link or to the Internet via an internet service provider (ISP). I/O device(s) 619 may also include a network interface device to provide a direct connection to a remote server computer systems via a direct network link to the Internet via a POP (point of presence). Such connection may be made using, for example, wireless techniques, including digital cellular telephone connection, Cellular Digital Packet Data (CDPD) connection, digital satellite data connection or the like. Examples of I/O devices include modems, sound and video devices, and specialized communication devices such as the aforementioned network interface.

Computer programs and data are generally stored as instructions and data in mass storage 609 until loaded into main memory 615 for execution. Computer programs may also be in the form of electronic signals modulated in accordance with the computer program and data communication technology when transferred via a network. The method and functions relating to nonlinear site flow context development operation 400 may be implemented in a computer program alone or in conjunction with other hardware.

The processor 613, in one embodiment, is a microprocessor manufactured by Intel, such as a Pentium class processor. However, any other suitable single or multiple microprocessors or microcomputers may be utilized. Main memory 615 is comprised of dynamic random access memory (DRAM). Video memory 614 is a dual-ported video random access memory. One port of the video memory 614 is coupled to video amplifier 616. The video amplifier 616 is used to drive the display 617. Video amplifier 616 is well known in the art and may be implemented by any suitable means. This circuitry converts pixel data stored in video memory 614 to a raster signal suitable for use by display 617. Display 617 is a type of monitor suitable for displaying graphic images.

The computer system described above is for purposes of example only. Elements of NLSF System 300 may be implemented in any type of computer system or programming or processing environment.

Many embodiments of the present invention have application to a wide range of industries including the following: computer hardware and software manufacturing and sales, professional services, financial services, automotive sales and manufacturing, telecommunications sales and manufacturing, medical and pharmaceutical sales and manufacturing, and construction industries.

Although the present invention has been described in detail, it should be understood that various changes, substitutions and alterations can be made hereto without departing from the spirit and scope of the invention as defined by the appended claims. For example, it will be apparent to those of ordinary skill in the art that other Web systems and associated software components may be used to implement the NLSF System 300. Additionally, other information could be stored, the NLSF System 300 Characteristics modified, and/or other NLSF System 300 characteristics developed in addition to or in lieu of the Characteristics set forth in Table 1 to effectuate developing session context from nonlinear site flow records. For example, request identifier from a user may be communicated to a server in any number of well-known ways other than using a query string.

What is claimed is:

1. A method of developing user context from user Web session data that includes nonlinear site flow events, the method comprising:
   (a) detecting a nonlinear site flow event in the user session data by identifying in the user session data an indication of the nonlinear site flow event;
   (b) determining which, if any, information associated with the nonlinear site flow event detected in (a) should be included in the user context; and
   (c) developing the user context using the information, if any, associated with the nonlinear site flow event determined in accordance with (b).

2. The method of claim 1 wherein determining which, if any, information associated with the nonlinear site flow event should be included in the user context comprises:
   determining whether the nonlinear site flow event represents a new user request or a past user request; and
   developing the user context further comprises:
   recording data associated with the nonlinear site flow if the nonlinear site flow event is determined to represent a new user request.

3. The method of claim 1 wherein detecting a nonlinear site flow event comprises:
   receiving a request identifier from a client-side system that provides an identifier for a next expected Web page to be provided by a Web server application;
   determining whether the request identifier received from the client-side system is the request identifier expected by a server-side system that includes the Web server application.

4. The method of claim 3 further comprising:
   including a next page request identifier in a query string from a client-side system; and
   tracking expected next page request identifiers in a server-side system.

5. The method of claim 1 wherein determining which, if any, information associated with the nonlinear site flow event should be included in the user context comprises:
   storing state data for each batch of user session events;
   after detecting a nonlinear site flow event, comparing first state data associated with an immediately preceding batch of events with second state data associated with a batch events associated with a page request identifier received from a client-side system;
   if the first state data matches the second state data, excluding the information associated with the nonlinear site flow event in the user context; and
   if the first state data does not match the second state data, including the information associated with the nonlinear site flow event in the user context.

6. The method of claim 1 wherein each nonlinear site flow event is associated with a batch of events corresponding to a single user Web session request, the method further comprising:
   including a nonlinear site flow identifier as a first event in each batch of events associated with a nonlinear site flow event.

7. The method of claim 1 further comprising:
   repeating (a), (b), and (c) for a plurality of user sessions; and
   developing a product demand signal from user contexts developed in (c).

8. A computer-readable storage medium having instructions encoded therein when executed by a processor to:
   (a) detect a nonlinear site flow event in the user session data by identifying in the user session data an indication of the nonlinear site flow event;
   (b) determine which, if any, information associated with the nonlinear site flow event detected in (a) should be included in the user context; and
   (c) develop the user context using the information, if any, associated with the nonlinear site flow event determined in accordance with (b).

9. The computer-readable storage medium of claim 8 is selected from the set of a disk, tape or other magnetic, optical, or electronic storage medium.

10. A method for detecting nonlinear site flow and developing an accurate user session context, the method comprising:
 (a) receiving Web page requests initiated by a user, wherein the requests each include a respective request identifier that identifies a next page expected to be provided to the user by a Web server application;
 (b) recording each batch of events associated with each Web page request;
 (c) tracking a server-side identifier for each batch of events associated with each Web page request;
 (d) recording a nonlinear site flow event for a batch of events when the request identifier in the Web page request does not correspond to the server-side identifier;
 (e) determining which, if any, information associated with the nonlinear site flow event should be included in the user context; and
 (f) developing the user context using the information, if any, associated with the nonlinear site flow event determined in (e).

11. The method of claim 10 further comprising:
 determining whether the nonlinear site flow event represents a new user request or a past user request; and
 developing the user context further comprises:
  recording data associated with the nonlinear site flow if the nonlinear site flow event is determined to represent a new user request.

12. The method of claim 10 wherein the Web page request comprises a query string and the request identifier is embedded in the query string.

13. The method of claim 10 wherein determining which, if any, information associated with the nonlinear site flow event should be included in the user context comprises:
 storing state data for each batch of user session events;
 after detecting a nonlinear site flow event, comparing first state data associated with an immediately preceding batch of events with second state data associated with a batch events associated with a page request identifier received from a client-side system;
 if the first state data matches the second state data, excluding the information associated with the nonlinear site flow event in the user context; and
 if the first state data does not match the second state data, including the information associated with the nonlinear site flow event in the user context.

14. The method of claim 10 further comprising:
 repeating (a) through (f) to develop a set of user session contexts;
 developing a product demand signal from the set of user contexts.

15. A system for developing user session context from user session records that include nonlinear site flow events, the system comprising:
 a processor; and
 a memory coupled to the processor and having instructions stored therein and executable by the processor to:
  (a) detect a nonlinear site flow event in the user session data by identifying in the user session data an indication of the nonlinear site flow event;
  (b) determine which, if any, information associated with the nonlinear site flow event detected in (a) should be included in the user context; and
  (c) develop the user context using the information, if any, associated with the nonlinear site flow event determined in accordance with (b).

16. The system of claim 15 further comprising:
 one or more server applications to receive user session requests and record a batch of events corresponding to each user session request.

17. The system of claim 15 wherein the instructions to determine which, if any, information associated with the nonlinear site flow event should be included in the user context further comprise instructions to:
 determine whether the nonlinear site flow event represents a new user request or a past user request; and
 the instructions to develop the user context further comprise instructions to:
  record data associated with the nonlinear site flow if the nonlinear site flow event is determined to represent a new user request.

18. The system of claim 15 instructions to detect a nonlinear site flow event further comprise instructions to:
 determine whether a request identifier received from a client-side system is the request identifier expected by a server-side system.

19. The system of claim of claim 18 wherein the memory further includes instructions to:
 include a next page request identifier in a query string from a client-side system; and
 track expected next page request identifiers in a server-side system.

20. The system of claim 15 wherein instructions to determine which, if any, information associated with the nonlinear site flow event should be included in the user context comprise instructions to:
 store state data for each batch of user session events;
 after detecting a nonlinear site flow event, compare first state data associated with an immediately preceding batch of events with second state data associated with a batch events associated with a page request identifier received from a client-side system;
 if the first state data matches the second state data, exclude the information associated with the nonlinear site flow event in the user context; and
 if the first state data does not match the second state data, include the information associated with the nonlinear site flow event in the user context.

21. The system of claim 15 wherein each nonlinear site flow event is associated with a batch of events corresponding to a single user Web session request, and the memory further includes instructions to:
 include a nonlinear site flow identifier as a first event in each batch of events associated with a nonlinear site flow event.

22. The system of claim 15 wherein the memory further includes instructions to:
 perform (a), (b), and (c) for a plurality of user sessions; and
 develop a product demand signal from user contexts developed in (c).

23. A system for developing user context from user Web session data that includes nonlinear site flow events, the system comprising:
 means for detecting a nonlinear site flow event in the user session data by identifying in the user session data an indication of the nonlinear site flow event;
 means for determining which, if any, information associated with the nonlinear site flow event detected in (a) should be included in the user context; and
 means for developing the user context using the information, if any, associated with the nonlinear site flow event determined in accordance with the means for determining.

* * * * *